(12) United States Patent
Daraie (10) Patent No.: US 10,687,649 B2
(45) Date of Patent: Jun. 23, 2020

(54) HANDHELD CITRUS JUICER WITH ROTATING ELEMENT

(71) Applicant: Shadruz Daraie, Fairlawn, OH (US)

(72) Inventor: Shadruz Daraie, Fairlawn, OH (US)

( * ) Notice: Subject to any disclaimer, the term of this patent is extended or adjusted under 35 U.S.C. 154(b) by 210 days.

(21) Appl. No.: 15/451,317

(22) Filed: Mar. 6, 2017

(65) Prior Publication Data

US 2017/0332820 A1 Nov. 23, 2017

Related U.S. Application Data

(60) Provisional application No. 62/304,258, filed on Mar. 6, 2016.

(51) Int. Cl.
| | | |
|---|---|---|
| *B30B 9/02* | (2006.01) | |
| *A47J 19/02* | (2006.01) | |
| *A47J 19/00* | (2006.01) | |
| *A47J 19/06* | (2006.01) | |

(52) U.S. Cl.
CPC .......... *A47J 19/022* (2013.01); *A47J 19/005* (2013.01); *A47J 19/023* (2018.08); *B30B 9/02* (2013.01); *A47J 19/06* (2013.01)

(58) Field of Classification Search
CPC .......... A47J 19/02; A47J 19/022; A47J 19/06; A47J 19/005; A47J 43/286; A47J 43/04; A47J 44/00; A47J 2043/04481; A47J 2043/0449; B30B 9/04; B30B 9/06; B30B 15/08; A23N 1/00; A23N 1/02; A23L 2/04
USPC .......... 100/110, 112, 213, 234, 243; 99/495, 99/501, 503, 505, 508, 506, 565
See application file for complete search history.

(56) References Cited

U.S. PATENT DOCUMENTS

| | | | | |
|---|---|---|---|---|
| 76,539 | A * | 4/1868 | Smith | A47J 19/022 |
| | | | | 100/213 |
| 331,236 | A * | 11/1885 | Herrick | A47J 19/022 |
| | | | | 100/213 |
| 468,341 | A | 2/1892 | Harris | |
| 1,234,146 | A | 7/1917 | Due Boe | |
| 1,683,850 | A * | 9/1928 | Ulrich | A47J 19/022 |
| | | | | 99/505 |

(Continued)

OTHER PUBLICATIONS

Joseph Joseph Helix Citrus Juicer website print-out from https://www.josephjoseph.com/en-us/helix-citrus-juicer; printed Jul. 5, 2019 (product introduction date unknown); 13 pages.

*Primary Examiner* — Jimmy T Nguyen
(74) *Attorney, Agent, or Firm* — Fay Sharpe LLP (57) ABSTRACT

A handheld citrus juicer includes first and second arms with respective inner and outer ends. The inner ends of the arms are pivotally connected such that the outer ends are manually movable relative to each other on an arc centered on a pivot axis. The arms include respective gripping portions adapted to be gripped by an associated user with one hand to squeeze the arms toward each other. The first arm includes a rotatable element connected thereto and selectively manually rotatable by the associated user about a rotational axis. The second arm includes a bowl connected thereto, the bowl aligned with the rotatable element when the first and second arms are moved toward each other. The rotatable element and the bowl are adapted to engage and extract juice from an associated cut-half of citrus fruit located between the rotatable element and the bowl. The rotatable element can be a reamer or a cup.

3 Claims, 9 Drawing Sheets

(56) References Cited

U.S. PATENT DOCUMENTS

| | | | | |
|---|---|---|---|---|
| 1,698,860 A | * | 1/1929 | Ulrich | A47J 19/022 |
| | | | | 210/467 |
| 1,887,764 A | | 11/1932 | Knapp | |
| 2,034,301 A | * | 3/1936 | Knapp | A47J 19/022 |
| | | | | 99/507 |
| 2,486,423 A | * | 11/1949 | Krieger | A47J 19/022 |
| | | | | 99/508 |
| 2,535,553 A | | 12/1950 | Stoner | |
| 2,818,797 A | * | 1/1958 | Ballor | B30B 9/062 |
| | | | | 100/98 R |
| 3,016,075 A | | 1/1962 | Mantelet | |
| 4,530,277 A | * | 7/1985 | Matsumoto | A47J 19/022 |
| | | | | 100/131 |
| 7,395,753 B2 | | 7/2008 | Dorion | |
| 9,107,531 B2 | * | 8/2015 | Wade | A23N 1/003 |
| 9,326,631 B2 | | 5/2016 | Shen et al. | |
| D826,653 S | | 8/2018 | Joseph | |
| 2006/0042480 A1 | * | 3/2006 | Blais | A47J 43/286 |
| | | | | 100/230 |
| 2007/0125244 A1 | * | 6/2007 | Hensel | A47J 19/02 |
| | | | | 99/501 |
| 2007/0289455 A1 | | 12/2007 | Dorion | |
| 2013/0186289 A1 | * | 7/2013 | Garcia | A47J 19/022 |
| | | | | 100/131 |
| 2015/0257571 A1 | * | 9/2015 | Shen | A47J 19/022 |
| | | | | 100/125 |
| 2016/0128377 A1 | | 5/2016 | Lee | |

* cited by examiner

HANDHELD CITRUS JUICER WITH ROTATING ELEMENT

CROSS-REFERENCE TO RELATED APPLICATION

This application claims priority from and benefit of the filing date of U.S. provisional application Ser. No. 62/304,258 filed Mar. 6, 2016, and the entire disclosure of said provisional application is hereby expressly incorporated by reference into the present specification.

BACKGROUND

Devices for extracting juice from a cut-half of a lime, lemon, or other citrus fruit are well-known and come in a wide variety of configurations. In a most basic form, a bowl includes reamer that is fixed in position and projects upwardly from a central region of the bowl. A user manually grasps the exterior skin or rind of the cut-half of fruit and engages the pulp or flesh of the fruit with the reamer with a pressing, grinding, and rotating operation such that juice is extracted from the fruit and collects in the bowl. In another variation, the bowl is omitted and the reamer is hand-held, and the user engages the reamer with the pulp of the fruit over a separate bowl or other container to collect the juice. In both cases, the devices do not provide any mechanical advantage to the user, and the operation of the reamer is uneven and inconsistent, with less than all of the available juice being extracted.

In another variety of juicer, the cut-half of fruit is crushed between a fixed (non-rotating) reamer and a cup-shaped member that engages the outer rind of the fruit and urges the pulp of the fruit into engagement with the reamer. In one version of such a device, the reamer and cup-shaped member are connected to respective arms or jaws that are pivotally connected to each other, and the user grips handles of the respective jaws with one or two hands and squeezes the jaws together to complete the fruit crushing operation. Such hand-held citrus crushing devices have been found to be ineffective and inefficient in extracting juice due to the inability of users to sufficiently crush the fruit and due to the unidirectional nature of the crushing operation without any rotating of the fruit or reamer relative to each other. In other version of such a device, the device is countertop mounted and includes a lever or rotating handle that is moved by the user to move the respective jaws together, in which case a linkage can be provided between the lever/handle and the jaws to provide a mechanical advantage. Such counter-top devices more completely crush the fruit, but still suffer from the lack of a structure for providing relative rotation between the reamer and the fruit. These counter-top devices are also too large and expensive for home use, and are difficult to clean.

Other citrus juicing devices include an electrically powered motor that drives a rotating reamer that is located above or otherwise adjacent a container that collects the extracted juice. A user manually presses the pulp of the cut-half of fruit into engagement with the motor-driven rotating reamer while the extracted juice is collected in the container. A primary disadvantage of these devices is that they are more expensive to purchase, require electrical power to operate, are more difficult to clean, and do not fit in a standard home drawer or are otherwise bulky to store when not in use.

In light of the foregoing, a need has been identified for a hand-held manual (non-electrically powered) citrus juicing device or "juicer" for extracting juice from a cut-half of a lemon, lime, or other citrus fruit in an effective and efficient manner, while still being easy to clean and convenient to store.

SUMMARY

In accordance with a first aspect of the present development, a handheld citrus juicer includes first and second arms comprising respective inner ends and respective outer ends spaced from the respective inner ends, the inner ends of the first and second arms pivotally connected such that the outer ends are manually movable relative to each other on an arc centered on a pivot axis. The first and second arms include respective gripping portions adapted to be gripped by an associated user with one hand to squeeze said first and second arms toward each other. The first arm comprising a rotatable element including a reamer rotatably connected thereto and selectively manually rotatable by the associated user about a rotational axis. The second arm comprises a bowl connected thereto, the bowl aligned with the rotatable element such that the reamer is aligned with and received in the recess of the bowl when the first and second arms are located adjacent each other. The reamer of the rotatable element is adapted to engage an associated cut-half of citrus fruit located in the bowl, the reamer rotatable with the rotatable element about the rotational axis relative to the first arm and relative to the bowl.

In accordance with another aspect of the present development, a handheld citrus juicer includes first and second arms with respective inner ends and respective outer ends spaced from the respective inner ends. The inner ends of the first and second arms are pivotally connected such that the outer ends are manually movable relative to each other on an arc centered on a pivot axis. The first and second arms include respective gripping portions adapted to be gripped by an associated user with one hand to squeeze said first and second arms toward each other. The first arm includes a rotatable element connected thereto and selectively manually rotatable by the associated user about a rotational axis. The second arm includes a bowl connected thereto, the bowl aligned with the rotatable element when the first and second arms are moved toward each other. The rotatable element and the bowl are adapted to engage and extract juice from an associated cut-half of citrus fruit located between the rotatable element and the bowl.

In accordance with a further aspect of the present development, a handheld citrus juicer includes first and second arms comprising respective inner ends and respective outer ends spaced from the respective inner ends, the inner ends of the first and second arms pivotally connected such that the outer ends are manually movable relative to each other on an arc centered on a pivot axis. The first arm includes a rotatable reamer rotatably connected thereto and selectively manually rotatable about a rotational axis. The second arm including a bowl connected thereto, the bowl aligned with the rotatable reamer such that the reamer is received in the bowl when the first and second arms are pivoted toward each other. The rotatable reamer adapted to engage and rotate relative to an associated cut-half of citrus fruit located in the bowl.

DETAILED DESCRIPTION

With reference to FIGS. 1-4, a handheld citrus juicing device or "juicer" J formed in accordance with a first embodiment of the present development is disclosed. The juicer J comprises a first (upper) arm A1 and a second (lower) arm A2 that is pivotally connected to the first arm A1 by a hinge H. More particularly, the first arm A1 comprises a first or inner end A1a and an opposite second or outer end A1b that is spaced from the first end A1a. The second arm A2 similarly comprises a first or inner end A2a and an opposite second or outer end A2b that is spaced from the first end A2a. The first ends A1a,A2a are pivotally interconnected by the hinge H such that the first and second arms A1,A2 pivot relative to each other about a pivot axis PX defined by the hinge H. A mid-point MP of each arm A1,A2 is located halfway between its respective first and second ends A1a, A1b or A2a,A2b.

As shown herein the hinge H comprises a hinge pin HP that is installed through aligned apertures respectively formed in the first ends A1a,A2a of the arms A1,A2, and the pivot axis PX is coincident with the longitudinal axis of the hinge pin HP. Alternatively, the arm first ends A1a,A2a are pivotally interconnected without a hinge pin HP, such as by interfitted or mating male and female structures located respectively on the first ends A1a,A2a or by a living hinge or any other suitable hinge structure. As such, the opposite, second ends A1b,A2b of the arms A1,A2 are manually movable toward and away from each other on an arc P centered at the pivot axis PX. The first and second arms A1,A2 pivot between a first or opened position or configuration where the first and second arms A1,A2 are spaced-apart or pivoted apart from each other and a second or closed position or configuration where the first and second arms A1,A2 are located or pivoted adjacent each other. The arms A1,A2 are manufactured from any suitable material such as a polymeric material that is injection molded or otherwise formed (e.g., using additive manufacturing methods), metal, or wood.

The arms A1,A2 are conformed and dimensioned such that a human user can use one hand to squeeze the arms A1,A2 toward each other on the arc P when a cut-half of a citrus fruit is located between the arms A1,A2 for extracting juice from the fruit as described further below. As such, the first and second arms A1,A2 comprise respective gripping portions AG that extend from their respective second or outer ends A1b,A2b toward their respective first or inner ends A1a,A2a and that are shaped to fit a user's hand and are adapted to be gripped by a user to perform the required one-handed squeezing operation as required to urge the outer ends A1b,A2b toward each other during a juicing operation.

One of the arms A1,A2 provides or functions as base arm or passive arm that supports a cut-half of a citrus fruit, and the other one of the arms A1,A2 provides or functions as a working arm or active arm that includes a rotating or rotatable element that is engaged with the cut-half of citrus fruit being juiced and manually rotated by a user with a second hand while the user's first hand is squeezing the first and second arms A1,A2 toward each other. In the illustrated embodiment of FIGS. 1-4, the first arm A1 provides the active arm and the second arm A2 comprises the passive arm (base).

In particular, the second or passive arm A2 of the illustrated embodiment comprises a cup or bowl structure B connected thereto and/or formed as part thereof, and the bowl B is adapted to receive and retain a cut-half of citrus fruit with the rounded outer surface skin or rind portion of the fruit oriented toward the inside of the bowl B and the cut surface of the flesh or pulp of the fruit exposed and oriented or facing toward the active arm A1. The bowl B is located adjacent the first end A2a of the arm A2, i.e., between a mid-point of the second arm A2 and the first end A2a and as close to the first end as practicable for maximum mechanical advantage.

The bowl B comprises a body B1 that is curved so as to define a concave space or recess B2 with an inner surface B3 and an opposite exterior or outer surface B4. An upper or outer edge B5 of the bowl body B1 defines a mouth B6 that leads to the recess B2 and that is circular or at least generally circular so as to match the cross-sectional shape of a lemon or other citrus fruit at the fruit's mid-section or equator. The body B1 and recess B2 thereof are dimensioned and shaped so that a lemon, lime, or other cut-half of citrus fruit is closely received in the recess B2 in the orientation described above, with the fruit outer rind oriented inwardly toward the inner surface B3 of the recess B2, to minimize the space between the outer rind of the fruit and an inner surface B3 of the recess B2. The bowl B preferably further comprises at least one and, most preferably, a plurality of nibs or bosses B7 that project from the inner surface B3 into the recess B2 and that are shaped with angled edges, teeth, or other gripping features for engaging the outer rind of the citrus fruit received in the recess B2 of the bowl B to prevent or at least inhibit rotational movement of the citrus fruit relative to the bowl inner surface B3 during the juicing process. The bowl B optionally comprises one or more juice outlet slots or juice outlet holes B8 (shown in broken lines in FIG. 3) formed in the body B1 and that extend completely through the body B1 from the inner surface B3 to the outer surface B4 and that provide an exit flow path for juice extracted from the citrus fruit being juiced. The juice outlet holes B8 are preferably dimensioned so that large pieces of pulp and seeds do not flow there through and are, instead, retained in the recess B2 of the bowl B.

Figure 1:
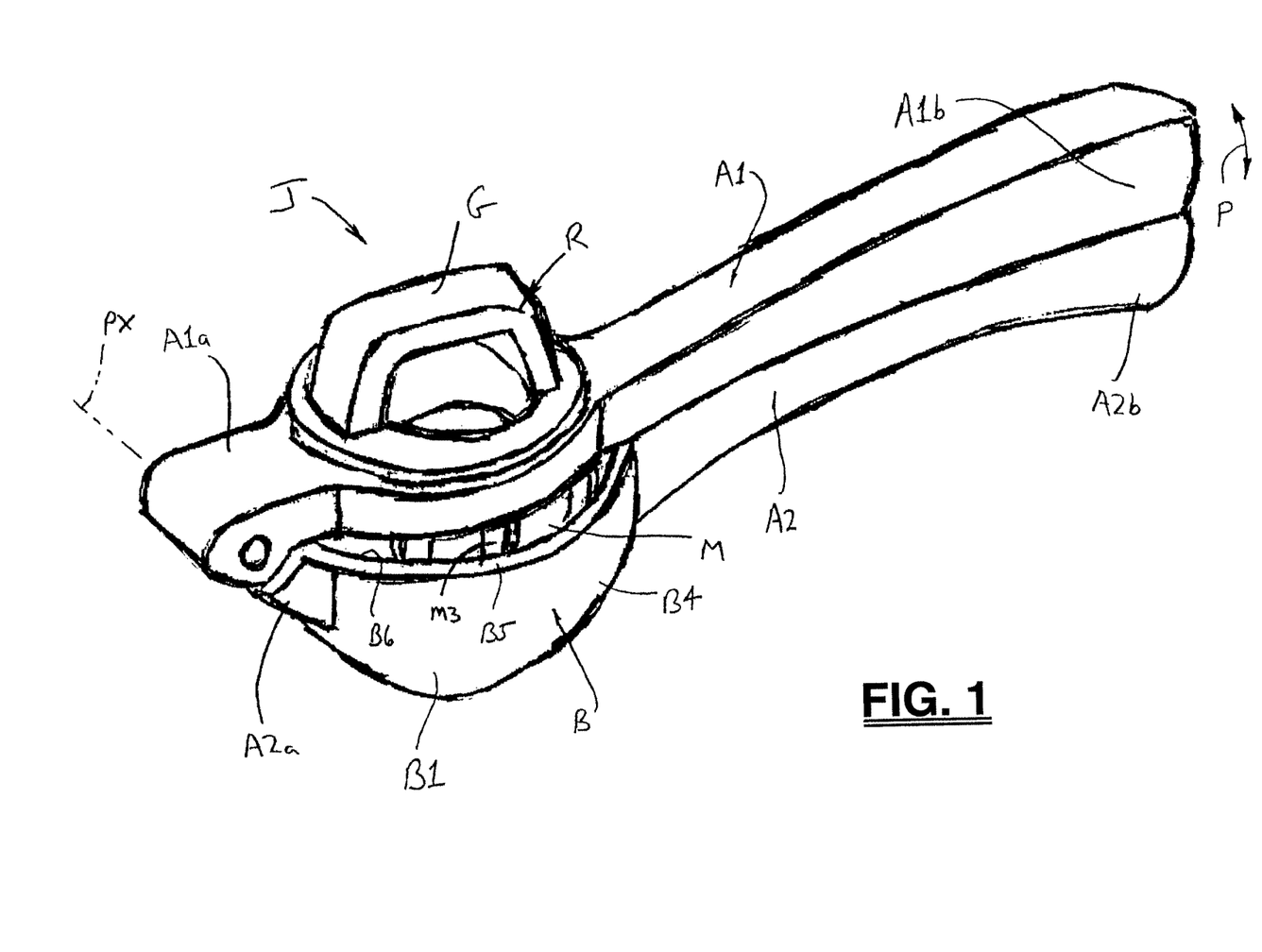
FIG. 1 is an isometric view of a handheld citrus juicing device or "juicer" formed in accordance with a first embodiment of the present development.
Figure 2:
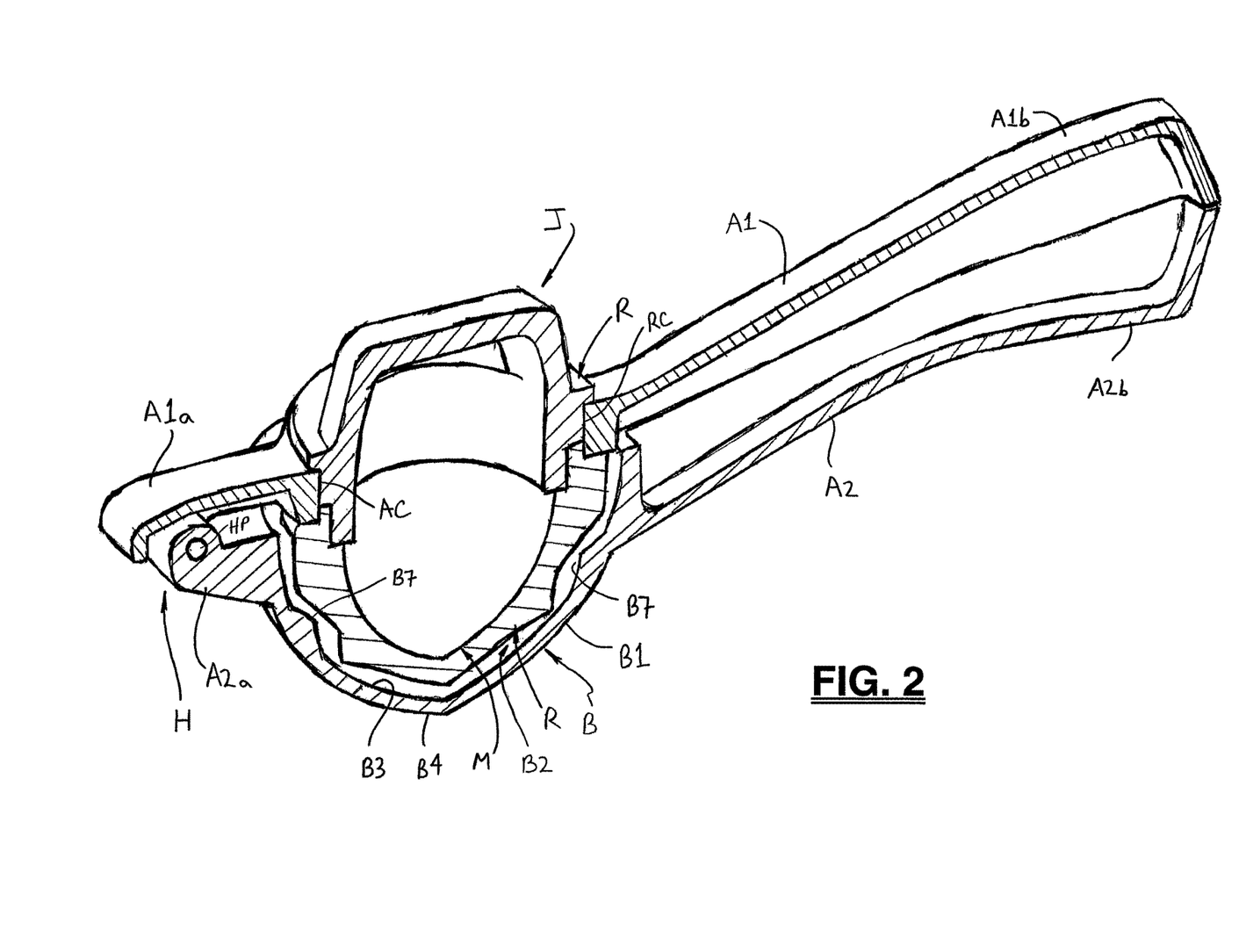
FIG. 2 is an isometric section view of the handheld citrus juicer of FIG. 1.
Figure 3:
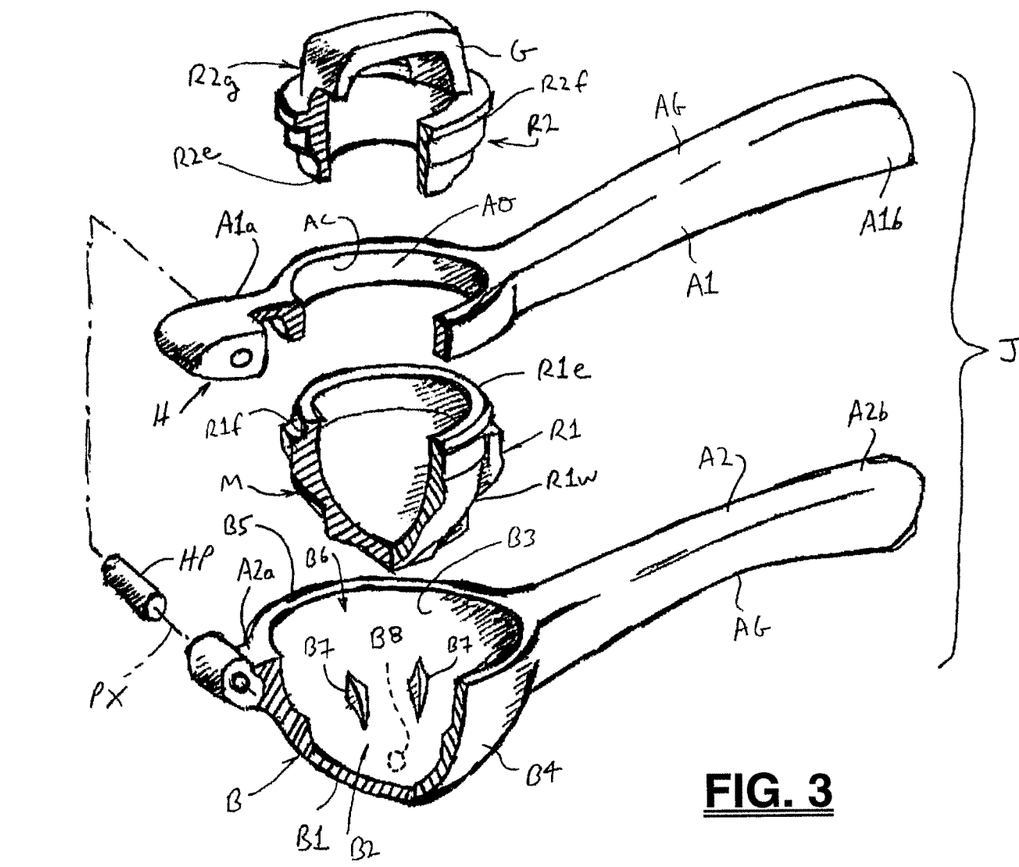
FIG. 3 provides exploded isometric view of the juicer shown in FIG. 1, with certain components shown in partial section.
Figure 4:
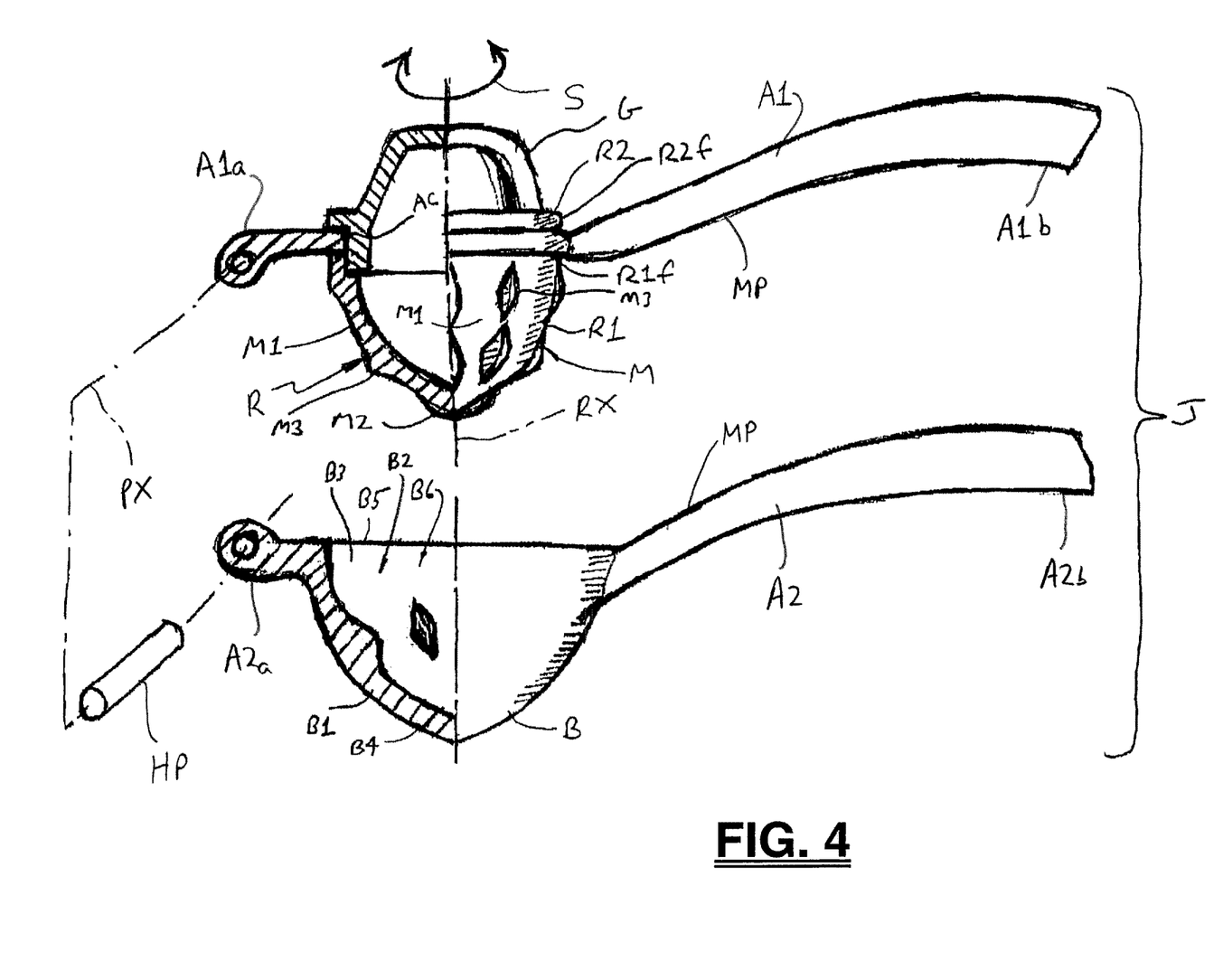
FIG. 4 is an exploded side view of the juicer shown in FIG. 1, with portions of the components shown in section.
Figure 5:
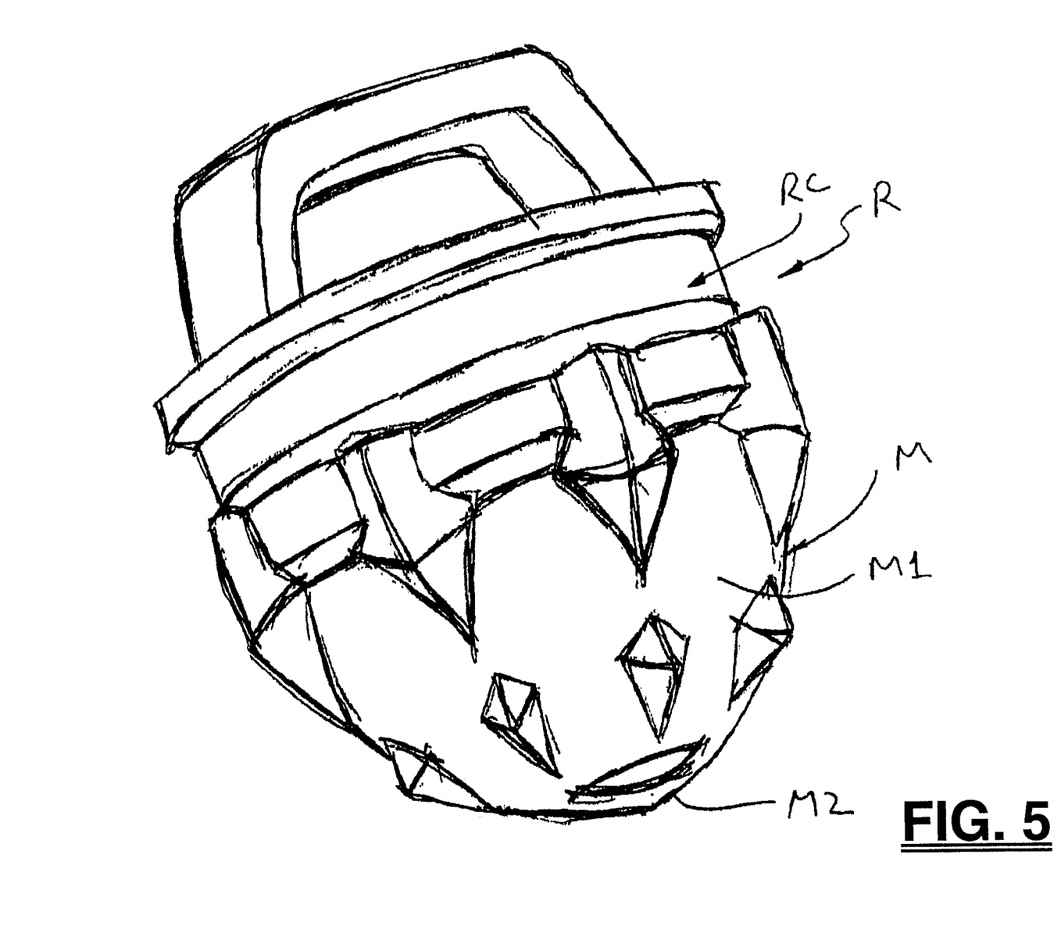
FIG. 5 is an isometric view of a rotating reamer portion of the juicer of FIG. 1.

As noted above, the first arm A1 of the illustrated embodiment comprises the active arm that includes a rotating or rotatable structure or rotatable element R for engaging the cut surface or flesh/pulp of the cut-half of citrus fruit support in the bowl B of the passive arm A2 to extract juice from the fruit. The rotatable element R of the first juicer embodiment J is shown separately in FIG. 5. The rotatable element R is rotatably connected to the first (active) arm A1 adjacent the first end A1a of the first arm, i.e., between a mid-point of the first arm A1 and the first end A1a and as close to the arm first end A1a as practicable for maximum mechanical advantage. The rotatable element R also is located on the first arm A1 in a position where it is aligned with the recess B2 of the bowl B so that the rotatable element R is operatively positioned to engage the cut face of the citrus fruit supported in the recess B2 of the bowl B. The rotatable element R rotates relative to the first arm A1 about an axis of rotation or rotational axis RX (FIG. 4). The bowl B comprises a primary bowl axis BX that is preferably a central axis that is centrally located such that the recess B2 is symmetrically defined about the bowl axis BX, and the rotational axis RX and bowl axis BX are preferably coincident or aligned when the first and second arms A1,A2 are adjacent each other in the second or closed position or configuration.

In the juicer embodiment J of FIGS. 1-4, the first arm A1 comprises a rotatable element support opening AO (FIG. 3) in which the rotatable element R is received, retained, and supported for rotation about the rotational axis RX relative to the first arm A1. In the illustrated embodiment, the support opening AO comprises or is defined by a cylindrical inner wall AC such that the support opening AO is a circular opening. The rotatable element R correspondingly includes a cylindrical outer bearing surface RC (FIG. 5) that defines an outside diameter that is minimally smaller than the inside diameter defined by the cylindrical inner wall AC of the support opening AO, and the rotatable element R is positioned in the support opening AO with its cylindrical outer bearing surface RC axially aligned with the cylindrical inner wall AC of the support opening AO so that the rotatable element is R is reciprocally rotatable about the rotational axis RX in first (clockwise) and second (counter-clockwise) opposite rotational directions in the support opening AO as indicated by the arrow S (FIG. 4).

The rotatable element R is installed in the support opening AO using any suitable and convenient structure. In the juicer embodiment J of FIGS. 1-5, the rotatable element R comprises first and second separate portions R1,R2 (see FIGS. 3 & 4) that are selectively connected together to construct the rotatable element R after the first and second portions R1, R2 are inserted into opposite sides of the support opening AO such that the assembled rotatable element R is axially captured in the support opening AO. More particularly, the first portion R1 comprises an upper edge R1e and a lower or working portion R1w that includes a fruit reamer M. The second portion R2 comprises an upper or gripping portion R2g that comprises a grip G adapted to be grasped by a user so that the user can manually rotate the rotatable element R about the rotational axis RX in the support opening AO, and also comprises a lower edge R2e. The first portion R1 comprises a first flange or other radially enlarged structure (s) R1f that cannot pass through the support opening AO, and the second portion R2 comprises a second flange or other radially enlarged structure(s) R2f that cannot pass through the support opening AO.

To assemble the rotatable element R operatively to the first arm AO, the upper edge R1e of the first portion R1 is inserted into the inside of the support opening AO (the side of the opening AO oriented toward the bowl B), and the lower edge R2e of the second portion R2 is inserted into the opposite side or outside of the support opening AO (the side of the opening AO oriented away the bowl B), and the first and second portions R1,R2 are then mated and mechanically and/or adhesively connected together via frictional engagement, snap-fit, screw threads, ultrasonic welding, and/or any other connection structure or means that is permanent or temporary and that connects the first and second portions R1, R2 together in a manner such that they do not rotate relative to each other in operative use so as to define the rotatable element R. In this manner the flanges or other radially enlarged portions R1f,R2f limit axial movement of the rotatable element R and capture the rotatable element R in the support opening AO. The cylindrical outer bearing surface RC of the rotatable element R can be provided as part of either the first portion R1, the second portion R2, or each portion R1,R2 can comprise an axial length of the bearing surface RC such that the cylindrical bearing surface RC is defined when the first and second portions R1,R2 are connected together. In one embodiment, the first and second portions R1,R2 are selectively separable from each other for disassembly and removal of the rotatable element R from the support opening AO for cleaning. In the illustrated embodiment, the rotatable element R is defined from a polymeric material, but other materials can be alternatively or additionally used without departing from the scope and intent of the present development.

As noted, the rotatable element R comprises a reamer M. The reamer M includes a projecting cone or other tapered outer surface M1 that converges to a tip M2 as it extends away from the grip G. The outer surface M1 of the reamer includes a plurality of nibs M3 that project outwardly from the outer surface M1. As shown in the section view of FIG. 2, the tapered outer surface M1 is dimensioned and conformed to fit closely within the recess B2 of the bowl B when the arms A1,A2 are in the closed position while leaving space between the outer surface M1 and the bowl inner surface B3 to accommodate the rind of an associate cut-half of citrus fruit to maximize juice extraction but prevent shredding of the rind as could introduce bitter pieces thereof into the extracted juice. As such, the outer surface M1 of the reamer fits closely within the empty rind of a cut-half of a lemon, lime or other citrus fruit after the fruit has been juiced, and the nibs M3 engage and crush the pulp of the fruit during rotation of the rotatable element R (rotating/rotatable reamer R in this embodiment) to extract juice therefrom.

To use the juicer J, a lemon, lime, orange, grapefruit, or other citrus fruit is cut in half near its midsection, and the arms A1,A2 of the juicer J are pivoted apart from each other on the arc P sufficiently to allow the cut-half of citrus fruit to be operatively installed in the recess B2 of the bowl B, with the outer rind of the citrus fruit oriented downward toward the inner surface B3 of the bowl B. The first and second arms A1,A2 are then pivoted on the arc P toward each other such that the tip M2 of the reamer M engages the exposed pulp of the citrus fruit at the cut surface. The user grips the respective grip portions AG of the first and second arms A1,A2 with a single hand and squeezes the first and second arms A1,A2 toward each other on the arc P such that the reamer M crushes the exposed pulp of the citrus fruit. Simultaneously, while the user is squeezing/urging the first and second arms A1,A2 toward each other, the user grips the grip G of the rotatable element R (rotatable reamer R) and rotates the rotatable element R in one or both directions about the rotational axis RX such that the reamer M rotates relative to the pulp of the citrus fruit being squeezed and the reamer nibs M3 further crush the pulp of the fruit to extract juice therefrom due to the rotation of the reamer M. When the first and second arms A1,A2 are located in the second, closed position, the rotational axis RX and bowl axis BX are aligned and the reamer M is received in the recess B2 of the bowl B. The extracted juice is poured from the bowl B via the mouth B6 of the bowl during and/or after completion of the juicing operation, or the juice is drained into an container through the optional juice outlet holes B8 defined in the bowl B.

Figure 6:
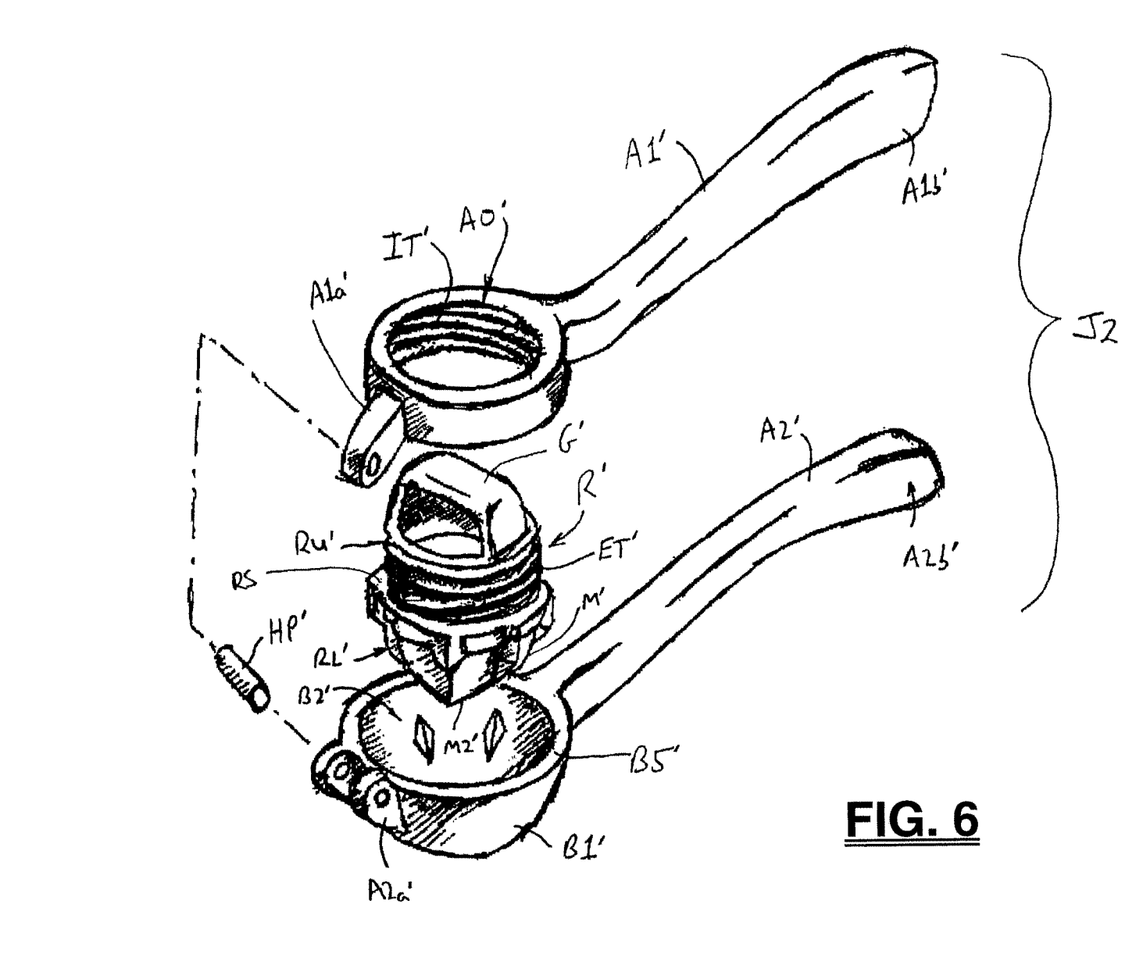
FIG. 6 is an exploded isometric view of an alternative embodiment of a juicer formed in accordance with the present development.
Figure 7:
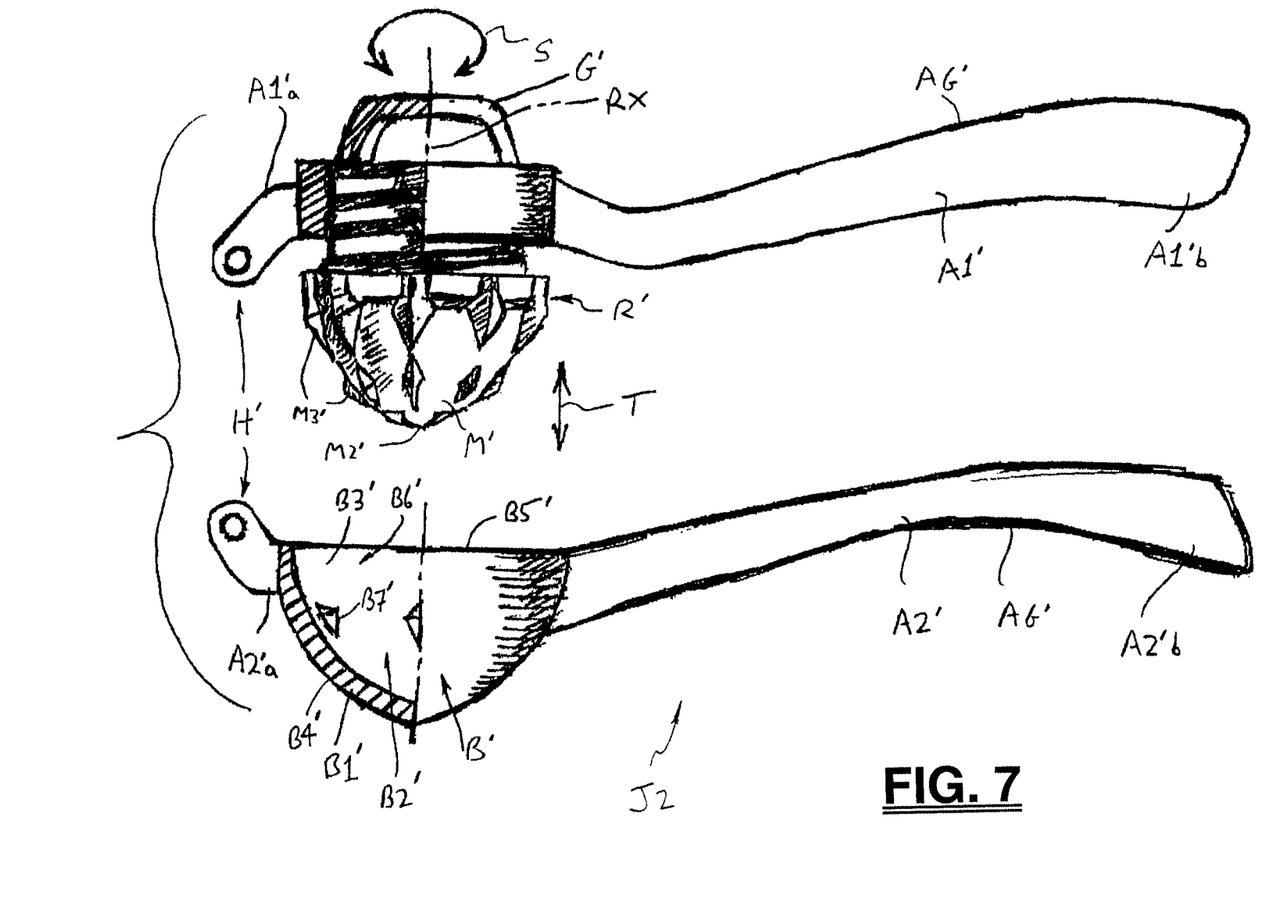
FIG. 7 is an exploded side view of the juicer shown in FIG. 6, with portions of the components shown in section.

FIGS. 6 and 7 show a juicer J2 formed in accordance with a second embodiment of the present development. Except as otherwise shown and/or described herein, the juicer J2 is identical to the juicer J, and like components relative to the juicer J are identified by like reference characters that include a primed (') designation, sometimes without further description here except as required to understand the structure and operation of the juicer J2. New components are identified with new reference characters as described below.

More particularly, the juicer J2 differs from the juicer J in that the rotatable element R' is axially moveable along the rotational axis RX relative to the first arm A1' in forward and rearward (in and out) directions T while the rotatable element R' is being rotated about the rotational axis RX. In the illustrated embodiment, the rotatable element R' is threadably connected to the first (active) arm A1' in the support opening AO' such that manual rotation of the rotatable element R' about the rotational axis RX causes the rotatable element to move axially on the rotational axis RX and advance or retract relative to the first arm A1' (and relative to the second arm A2' and cut-half of citrus fruit located in the recess B2' of the bowl B' as indicated by the arrow T in FIG. 7. Rotation of the rotatable element R' in first and second rotational directions induces axial movement of the rotatable element R' along said rotational axis RX in corresponding first and second axial directions.

Referring particularly to FIG. 6, it can be seen that the support opening AO' comprises internal threads IT', such as helical threads, and the rotatable element R' comprises external threads ET', such as helical threads, that mate with the internal threads IT' of the support opening AO' for operably connecting the rotatable element R' to the first (active) arm A1'. The term "threads" is not to be limited to helical threads and is instead intended to encompass any mechanical structure or feature of a first element that mates with another corresponding feature of a second element such that rotation of first and second elements relative to each other induces axial movement of first and second elements relative to each other. The rotatable element R' is a one-piece construction or a multi-piece assembly defined from a polymeric or other material. The rotatable element R' includes an upper portion RU' including the external threads ET and a lower portion RL' that includes the reamer M'. The reamer M' is aligned with the bowl B' and received in the recess B2' thereof when the arms A1',A2' are in the second, closed position. A radially enlarged flange or shoulder RS separates the upper and lower portions RU',RL' and is located axially between the reamer M' and the external threads ET threads. The shoulder RS is radially larger than the inside diameter of the support opening AO', while the upper portion RU' is dimensioned to fit within the support opening AO' such that the rotatable element R' is engaged with the first arm A1 by threading the upper portion RU' into the support opening AO' from the inside/underside of the arm A1' that is oriented toward the second arm A2'. The radially enlarged shoulder RS acts as a stop that limits rotation of the rotatable element R' in a direction that retracts the rotatable element away from the bowl B'. Alternatively, the shoulder RS is omitted, in which case the rotatable element R' can be threaded into the support opening AO' from either side. Preferably, axial movement of the rotatable element R' in the direction toward the bowl B' is not limited except by contact of the reamer M' with the bowl B'.

The juicer J2 is used in a manner that is identical to the juicer J, except that upon rotation of the rotatable element R' in a first (clockwise) direction by the user while the user is gripping (and optionally squeezing together) the arms A1', A2', the rotatable element R' is axially advanced along the rotational axis RX toward the bowl B so that the reamer M' is urged axially into engagement with the fruit being juiced while the reamer M' is rotating to increase the efficiency and effectiveness of juice extraction while also assisting the user by increasing the juice extracted for a given magnitude of squeezing of the arms A1',A2' toward each other.

Figure 8:
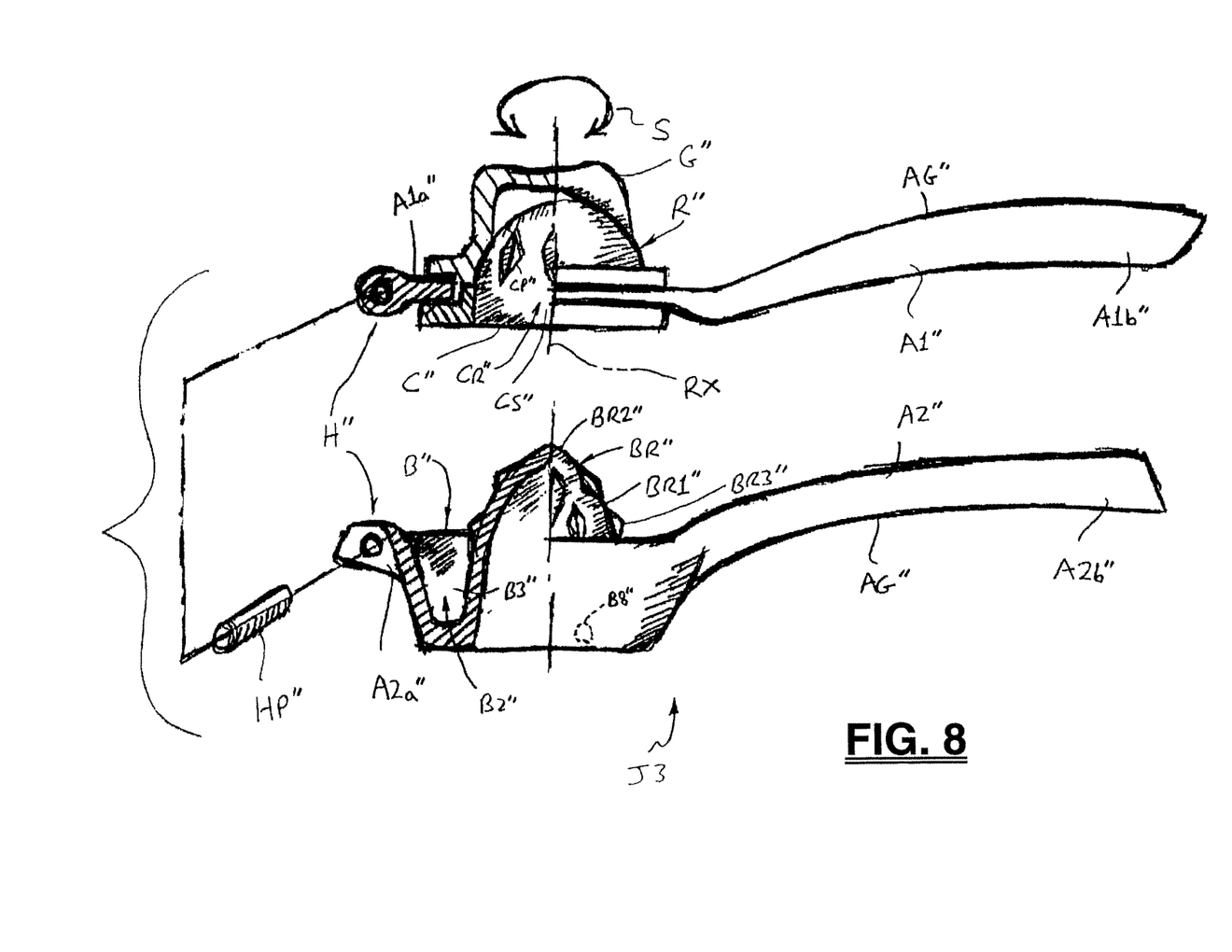
FIG. 8 is an exploded side view of a handheld juicer formed in accordance with another alternative embodiment of the present development, with parts thereof shown in section.

FIG. 8 shows a juicer J3 formed in accordance with a third embodiment of the present development. Except as otherwise shown and/or described herein, the juicer J3 is identical to the juicer J, and like components relative to the juicer J are identified by like reference characters that include a double-primed (") designation, sometimes without further description here excepts as required to understand the structure and operation of the juicer J3. New components are identified with new reference characters as described below.

More particularly, the juicer J3 differs from the juicer J in that the rotatable element R" comprises a cup C" that includes an internal recess CR" defined by an inner surface CS". The recess CR" of the cup C" is adapted to receive the cut-half of citrus fruit with the outer rind of the citrus fruit oriented toward the inner surface CS" of the cup. The inner surface CS" of the cup C" includes a plurality of projections or nibs CP" that engage and grip the outer rind the citrus fruit so that the fruit rotates together with the rotatable element R" when the rotatable element R" is manually rotated about the rotational axis RX.

The juicer J3 further differs from the juicer J in that the bowl B" includes a fixed or stationary reamer BR" located therein and surrounded by the recess B2" of the bowl B". The reamer BR" includes a projecting tapered outer surface BR1" that converges to a tip BR2" as it extends away from the inner surface B3" of the bowl B". The outer surface BR1" of the reamer BR" includes a plurality of nibs BR3" that project outwardly from the outer surface. The tapered outer surface BR1" is dimensioned and conformed to fit closely within the empty rind of a cut-half of a lemon, lime or other citrus fruit during and after the fruit has been juiced, and the nibs BR3" engage and crush the pulp of the fruit during rotation of the rotatable element R" (rotatable cup C" in this embodiment) to extract juice therefrom.

Figure 9A:
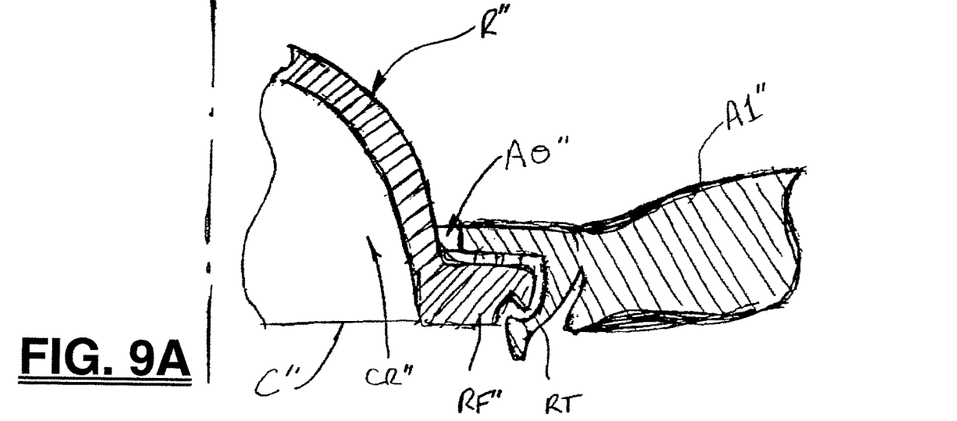
FIG. 9A is a partial section view that illustrates one example of a structure for connecting a rotating cup element or reamer element to one of the jaws or arms of a handheld juicer formed in accordance with the present development (a rotating cup element is shown but a rotating reamer element can be substituted in place of the rotating cup element using the same structural relationship)
Figure 9B:
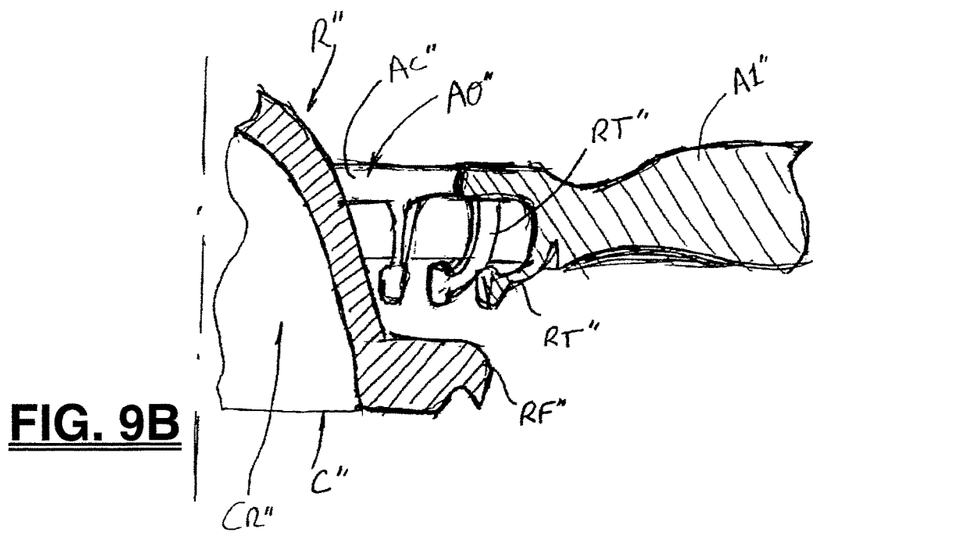
FIG. 9B provides an exploded view of FIG. 9A.

FIG. 9A is a partial section view that illustrates another alternative example of a structure for operably connecting the rotatable element R" to one of the arms A1",A2" (the arm A1" is shown). The arm A1" comprises a plurality of resilient tabs RT" that are located adjacent and spaced symmetrically about the support opening AO". The rotatable element R" comprises a radially enlarged flange RF" that is engaged by the resilient tabs RT" when the rotatable element R" is inserted into the support opening AO" on the side of the opening AO" where the resilient tabs RT" are located. When the rotatable element R" is inserted into the support opening AO", the resilient tabs RT" resiliently deflect outwardly to accommodate installation of the rotatable element R", and then resiliently return toward their undeflected position to capture the flange RF" and the rotatable element R" in the support opening AO" in a manner that allows for rotation of the rotatable element R" in the opening AO". The resilient tabs RT" are located on the inside of the arm A1" such that during use of the juicer J2, the rotatable element R" is urged axially into abutment with the arm A1" and not into engagement with the resilient tabs RT" which would undesirably cause the resilient tabs RT" to deflect outwardly and allow the rotatable element R" to separate from the arm A1". As shown in FIG. 9B, the rotatable element R" can be selectively separated from the arm A1" by deflecting the resilient tabs RT" outward sufficiently to allow escape of the flange RF" from the support opening AO". FIGS. 9A and 9B show the rotatable element R" as the rotating cup element C" of the juicer J3, but the rotatable reamer R of FIGS. 1-5 can be rotatably captured to the arm A1 or A1" using the same structure as shown in FIGS. 9A and 9B by including a radially enlarged flange such as RF" on the rotatable element R to be engaged by the resilient tabs RT".

To use the juicer J3, a lemon, lime, orange, grapefruit, or other citrus fruit is cut in half near its midsection, and the arms A1",A2" of the juicer J2 are pivoted apart from each other on the arc P sufficiently to allow the cut-half of citrus fruit to be operatively received in the recess CR" of the rotatable cup element C", with the outer rind of the citrus fruit oriented toward the inner surface CS" of the cup C" and the flesh or pulp of the citrus fruit oriented toward the reamer BR". The first and second arms A1",A2" are then pivoted on the arc P toward each other such that the tip BR2" of the reamer BR" engages the exposed pulp of the citrus fruit at the cut surface. The user grips the first and second arms A1",A2" with a single hand and squeezes the first and second arms A1",A2" toward each other on the arc P such that the reamer BR" crushes the exposed pulp of the citrus fruit. Simultaneously, while the user is squeezing/urging the first and second arms A1",A2" toward each other, the user grips the grip G" of the rotatable element R" (rotatable cup C") and rotates the rotatable element R" in one or both directions about the rotational axis RX such that the fruit located in the recess CR" of the cup C" is rotated relative to the reamer BR" to crush the pulp of the fruit to extract juice therefrom. As such, the rotatable element C" and the bowl B" are adapted to engage and extract juice from an associated cut-half of citrus fruit located between the rotatable element C" and the bowl B".

The extracted juice is collected in the bowl B" or the juice is drained from the bowl B" into a container through the optional juice outlet holes B8" defined in the bowl B". Because the bowl B" and rotatable cup C" are located adjacent the hinge H" at the first or inner ends A1a",A2a" of the first and second arms, the arms A1",A2" of the juicer device J3 can be squeezed together toward the second, closed configuration during a juicing operation in a one-handed operation while the user can simultaneously rotate the cup C" with his or her other hand.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A handheld citrus juicer comprising:
first and second arms comprising respective inner ends and respective outer ends spaced from the respective inner ends, said inner ends of said first and second arms pivotally connected such that said outer ends are manually movable relative to each other on an arc centered on a pivot axis;
said first and second arms comprising respective gripping portions adapted to be gripped by an associated user with one hand to squeeze said first and second arms toward each other;
said first arm comprising a support opening comprising internal threads;
a rotatable element connected to said first arm and rotatable relative to said first arm about an axis of rotation, said rotatable element including: (i) an upper portion including a grip adapted to be grasped by a user for manually rotating said rotatable element relative to said first arm; and, (ii) a lower portion including a citrus fruit reamer that projects outwardly from the upper portion, wherein said reamer comprises a tapered outer surface that converges to a tip as said reamer extends away from the upper portion of the rotatable element;
said upper portion of said rotatable element further comprising a threaded region located between said grip and said reamer, said threaded region comprising a diameter that is larger than said tip of said reamer, wherein said threaded region of said upper portion is located in said support opening such that external threads of said rotatable element are mated with the internal threads of the support opening and such that said grip of said rotatable element projects from a first side of said support opening and said reamer projects from a second side of the support opening toward said second arm;
said second arm comprising a bowl connected thereto, said bowl aligned with said reamer of said rotatable element such that said reamer is aligned with and received in said bowl when said first and second arms are pivoted adjacent each other about said pivot axis;
said reamer of said rotatable element adapted to engage an associated cut-half of citrus fruit located in the bowl, said reamer rotatable with said rotatable element about said rotational axis relative to said first arm and relative to said bowl;
said rotatable element threadably connected to said first arm by said mated external and internal threads such that rotation of said rotatable element about said rotational axis in first and second rotational directions relative to said first arm induces axial movement of the rotatable element and reamer relative to said first arm along said rotational axis in respective first and second axial directions, wherein said outer ends of said first and second arms are configured to move toward each other on said arc about said pivot axis simultaneously with said rotatable element being axially moveable in said first and second axial directions relative to said first arm along said rotational axis in response to rotation of said rotatable element relative to said first arm in said first and second rotational directions;
wherein said rotatable element is located adjacent said inner end of said first arm between said inner end of said first arm and a mid-point of said first arm, wherein said mid-point of said first arm is located halfway between said inner end of said first arm and said outer end of said first arm.

2. The handheld citrus juicer as set forth in claim 1, wherein said bowl and said reamer each comprise a plurality of nibs projecting outwardly therefrom.

3. A handheld citrus juicer comprising:
first and second arms comprising respective inner ends and respective outer ends spaced from the respective inner ends, said inner ends of said first and second arms pivotally connected such that said outer ends are manually movable relative to each other on an arc centered on a pivot axis;

said first and second arms comprising respective gripping portions adapted to be gripped by an associated user with one hand to squeeze said first and second arms toward each other;

said first arm comprising a support opening and comprising a rotatable element located in said support opening;

said rotatable element including a reamer and selectively manually rotatable by the associated user about a rotational axis relative to said first arm;

said second arm comprising a bowl connected thereto, said bowl aligned with said rotatable element such that said reamer is aligned with and received in said bowl when said first and second arms are located adjacent each other;

said reamer of said rotatable element adapted to engage an associated cut-half of citrus fruit located in the bowl, said reamer rotatable with said rotatable element about said rotational axis relative to said first arm and relative to said bowl;

said rotatable element comprising a flange and said first arm comprises a plurality of resilient tabs that releasably engage said flange of said rotatable element to rotatably secure the rotatable element to the first arm.

* * * * *